(12) United States Patent
Kumar et al.

(10) Patent No.: US 12,004,251 B2
(45) Date of Patent: Jun. 4, 2024

(54) METHOD AND UE FOR DETERMINING REQUEST FOR RESOURCES FROM NETWORK APPARATUS IN WIRELESS NETWORK

(71) Applicant: SAMSUNG ELECTRONICS CO., LTD., Suwon-si (KR)

(72) Inventors: Lalith Kumar, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/658,219

(22) Filed: Apr. 6, 2022

(65) Prior Publication Data
US 2022/0322481 A1   Oct. 6, 2022

(30) Foreign Application Priority Data

Apr. 6, 2021   (IN) ............................. 202141016222
Mar. 31, 2022  (IN) ............................. 202141016222

(51) Int. Cl.
| | | |
|---|---|---|
| H04W 76/25 | (2018.01) | |
| H04L 1/1607 | (2023.01) | |
| H04W 68/00 | (2009.01) | |
| H04W 76/30 | (2018.01) | |

(52) U.S. Cl.
CPC .......... H04W 76/25 (2018.02); H04L 1/1664 (2013.01); H04W 68/005 (2013.01); H04W 76/30 (2018.02)

(58) Field of Classification Search
None
See application file for complete search history.

(56) References Cited

U.S. PATENT DOCUMENTS

| | | | |
|---|---|---|---|
| 9,596,576 B2 | 3/2017 | Ha | |
| 10,880,725 B2 | 12/2020 | Park et al. | |
| 2020/0145031 A1* | 5/2020 | Karlsson | ................ G01C 5/005 |
| 2022/0053448 A1* | 2/2022 | Velev | ..................... H04W 76/38 |
| 2022/0078742 A1* | 3/2022 | Tiwari | ................ H04W 60/005 |
| 2022/0159617 A1* | 5/2022 | Shih | ....................... H04W 76/27 |

(Continued)

FOREIGN PATENT DOCUMENTS

| | | |
|---|---|---|
| WO | 2012139755 A1 | 10/2012 |
| WO | 2020225160 A1 | 11/2020 |
| WO | 2021043417 A1 | 3/2021 |

OTHER PUBLICATIONS

3GPP TS 23.501 V17.1.0 (Jun. 2021); Technical Specification; 3rd Generation Partnership Project; Technical Specification Group Services and System Aspects; System architecture for the 5G System (5GS); Stage 2 (Release 17) 526 pages.

(Continued)

*Primary Examiner* — Lonnie V Sweet

(57) ABSTRACT

The disclosure relates to a 5G or 6G communication system for supporting a higher data transmission rate. Embodiments disclosed herein relate to a method for determining request for resources from a network apparatus in a wireless network by a first UE of a multi-USIM UE. The method includes determining that the first UE of the multi-USIM UE need to request for resources from the network apparatus in the wireless network to transmit pending uplink data to the network apparatus or receive pending downlink data from the network apparatus.

20 Claims, 8 Drawing Sheets

(56) References Cited

U.S. PATENT DOCUMENTS

| | | | | |
|---|---|---|---|---|
| 2022/0248362 | A1* | 8/2022 | Shaheen | H04W 60/005 |
| 2022/0303833 | A1* | 9/2022 | Bergström | H04W 36/00837 |
| 2022/0408519 | A1* | 12/2022 | Chen | H04W 76/34 |
| 2023/0007624 | A1* | 1/2023 | Murray | H04W 68/005 |
| 2023/0110991 | A1* | 4/2023 | Bienas | H04W 76/30 370/329 |
| 2023/0111055 | A1* | 4/2023 | Lin | H04W 76/18 370/329 |
| 2023/0120582 | A1* | 4/2023 | Zhang | H04W 60/00 370/329 |
| 2023/0189208 | A1* | 6/2023 | Kim | H04W 88/06 370/329 |

OTHER PUBLICATIONS

3GPP TS 23.502 V17.1.0 (Jun. 2021); Technical Specification; 3rd Generation Partnership Project; Technical Specification Group Services and System Aspects; Procedures for the 5G System (5GS); Stage 2 (Release 17) 692 pages.

3GPP TS 24.501 V17.3.0 (Jun. 2021); Technical Specification; 3rd Generation Partnership Project; Technical Specification Group Core Network and Terminals; Non-Access-Stratum (NAS) protocol for 5G System (5GS); Stage 3; (Release 17) 825 pages.

Intellectual Property India, "Examination report under sections 12&13 of the Patents Act," dated Oct. 26, 2022, in connection with Indian Patent Application No. 202141016222, 5 pages.

International Search Report and Written Opinion of the International Searching Authority dated Jun. 24, 2022, in connection with International Application No. PCT/KR2022/004934, 10 pages.

Samsung, "Open issues on network switching for Multi-USIM devices," 3GPP TSG-RAN WG2 Meeting #113bis-e, R2-2104174, Online, Apr. 12-20, 2021, 5 pages.

Qualcomm Incorporated, "Network switching mechanisms for Multi-SIM," 3GPP TSG-RAN WG2 Meeting #113bis-e, R2-2103224, Electronic, Apr. 12-20, 2021, 4 pages.

MediaTek Inc., "FS_MUSIM: KI#1&3—Handling of Busy and Leaving indications," SA WG2 Meeting #143E, S2-2100825, Feb. 24-Mar. 9, 2021, 8 pages.

Ericsson et al., "Function Description for Mulli-SIM devices," 3GPP TSG-SA2 Meeting # 143E (emeeting), S2-2100285, Elbonia, Feb. 24-Mar. 9, 2021, 7 pages.

Apple, "Leaving procedure for Multi-USIM UEs," 3GPP TSG-CT WG1 Meeting #129-e, C1-212136, Electronic meeting, Apr. 19-23, 2021, 35 pages.

* cited by examiner

METHOD AND UE FOR DETERMINING REQUEST FOR RESOURCES FROM NETWORK APPARATUS IN WIRELESS NETWORK

CROSS-REFERENCE TO RELATED APPLICATIONS

This application is based on and claims priority under 35 U.S.C. § 119(a) of an Indian provisional patent application number 202141016222, filed on Apr. 6, 2021, in the Indian Patent Office, and of an Indian Complete patent application number 202141016222, filed on Mar. 31, 2022, in the Indian Patent Office, the disclosures of which are incorporated by reference herein in their entirety.

BACKGROUND

1. Field

Embodiments disclosed herein relate to a wireless network, and more particularly related to a method and a user equipment (UE) for determining request for resources from a network apparatus in a wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The principal object of the embodiments herein is to disclose a method and a multi-USIM UE for determining request for resources from a network apparatus in a wireless network.

Another object of the embodiments herein is to provide that a first UE (this term represents the stack including application processor (AP), modem processor and memory which is related to USIM-1 or the first subscription in MUSIM UE1), and a second UE (this term represents the stack including an application processor, a modem processor, and memory which is related to USIM-2 or the second subscription in MUSIM UE), are part of same MUSIM UE. The first UE determines the first UE has either uplink data or downlink data to be sent, this means the first UE is required to include uplink data status IE or Allowed PDU session status or Active flag or set the following on request bit set. The first UE also determines that the first UE may send a NAS message with a release request indication because service on the second UE may be initiated. The first UE triggers a NAS procedure (like registration procedure or service request procedure) with a leaving/release request indication, in such a collision case, the first UE may not include uplink data status IE, allowed PDU session status IE, active status IE or follow-on request bit. So, that the release procedure can be executed quickly without spending time on establishing the resources and the UE can be released to the IDLE state or Inactive state as quickly as possible.

Another object of the embodiments herein is to provide that if there is a change in condition on the first UE due to which the first UE needs to update the PRs. The first UE is forbidden to send the NAS message to update the PRs. Further, the first UE waits for new trigger of NAS message due to some other reasons. When this NAS message due to new trigger is about to be sent, the PRs are piggybacked. The network apparatus processes the NAS message which was actually due to new trigger condition and also update the PRs. This avoids a NAS message which is sent dedicatedly to update the PRs from IDLE state and hence there is no signaling load on network apparatus due to updating of filters.

SUMMARY

Accordingly, the embodiments herein provide a method for determining request for resources from a network apparatus in a wireless network. The method includes determining, by a first UE of a multi-USIM UE, that the first UE of the multi-USIM UE need to request for resources from the network apparatus in the wireless network to send pending uplink data to the network apparatus or receive pending downlink data from the network apparatus. Further, the method includes determining, by the first UE of the multi-USIM UE, whether the first UE of the multi-USIM UE may send a NAS message with a "release request indication" due to a service pending on a second UE of the multi-USIM UE. Further, the method includes sending, by the first UE of the multi-USIM UE, the NAS message to the network apparatus without requesting for resources from the network apparatus in response to determining that the first UE of the multi-USIM UE may send a NAS message with the "release request indication."

In an embodiment, sending the NAS message without requesting for the resources from the network includes creating the NAS message by "not including an uplink data status IE (Information Element), an allowed PDU session status IE, an active status IE" or "by setting a follow-on request indicator to "no follow-on request pending," and sending, by the multi-USIM UE, the generated NAS message to the network apparatus.

In an embodiment, the resources are one of the user-plane resources and the NAS signaling connection.

In an embodiment, the method includes determining, by the first UE of the multi-USIM UE, whether the first UE of the multi-USIM UE is in an idle state. Further, the method includes forbidding the first UE of the multi-USIM UE to request the resources from the network apparatus by sending the NAS message with the "release request indication" to update the paging restrictions information In an embodiment, forbidding the first UE of the multi-USIM UE to request the resources from the network apparatus includes determining whether another NAS message is triggered due to another reason, wherein the triggered second NAS message is piggy backed with updated paging restriction information and the release request indication.

Accordingly, the embodiments herein provide a multi-USIM UE for determining request for resources from a network apparatus in a wireless network. The multi-USIM UE includes a first UE comprising a first USIM, a modem, memory, and an application processor (AP), a second UE comprising a second USIM, a modem, memory, and an application processor (AP) and a network resource request controller. The network resource request controller communicatively is coupled to a processor, the first UE and the second UE. The network resource request controller is configured to determine that the first UE of the multi-USIM UE need to request for resources from the network apparatus in the wireless network to send pending uplink data to the network apparatus or receive pending downlink data from the network apparatus. Further, the network resource request controller is configured to determine whether the first UE of the multi-USIM UE may send a NAS message with a "release request indication" due to a service pending on a second UE of the multi-USIM UE. Further, the network resource request controller is configured to send the NAS message to the network apparatus without requesting for resources from the network apparatus in response to determining that the first UE of the multi-USIM UE may send a NAS message with the "release request indication."

Accordingly, the embodiments herein provide a method for determining request for resources from a network apparatus in a wireless network. The method includes receiving, by the network apparatus, a NAS message. Further, the method includes deleting, by the network apparatus, old paging restrictions (PRs), storing updated PRs, and starting to apply PRs based on the received NAS message.

Accordingly, the embodiments herein provide a network apparatus for determining request for resources in a wireless network. The network apparatus includes a network resource request controller communicatively coupled to a processor and a memory. The network resource request controller is configured to receive a NAS message. Further, the network resource request controller is configured to delete old PRs, store updated PRs, and start to apply PRs based on the received NAS message.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
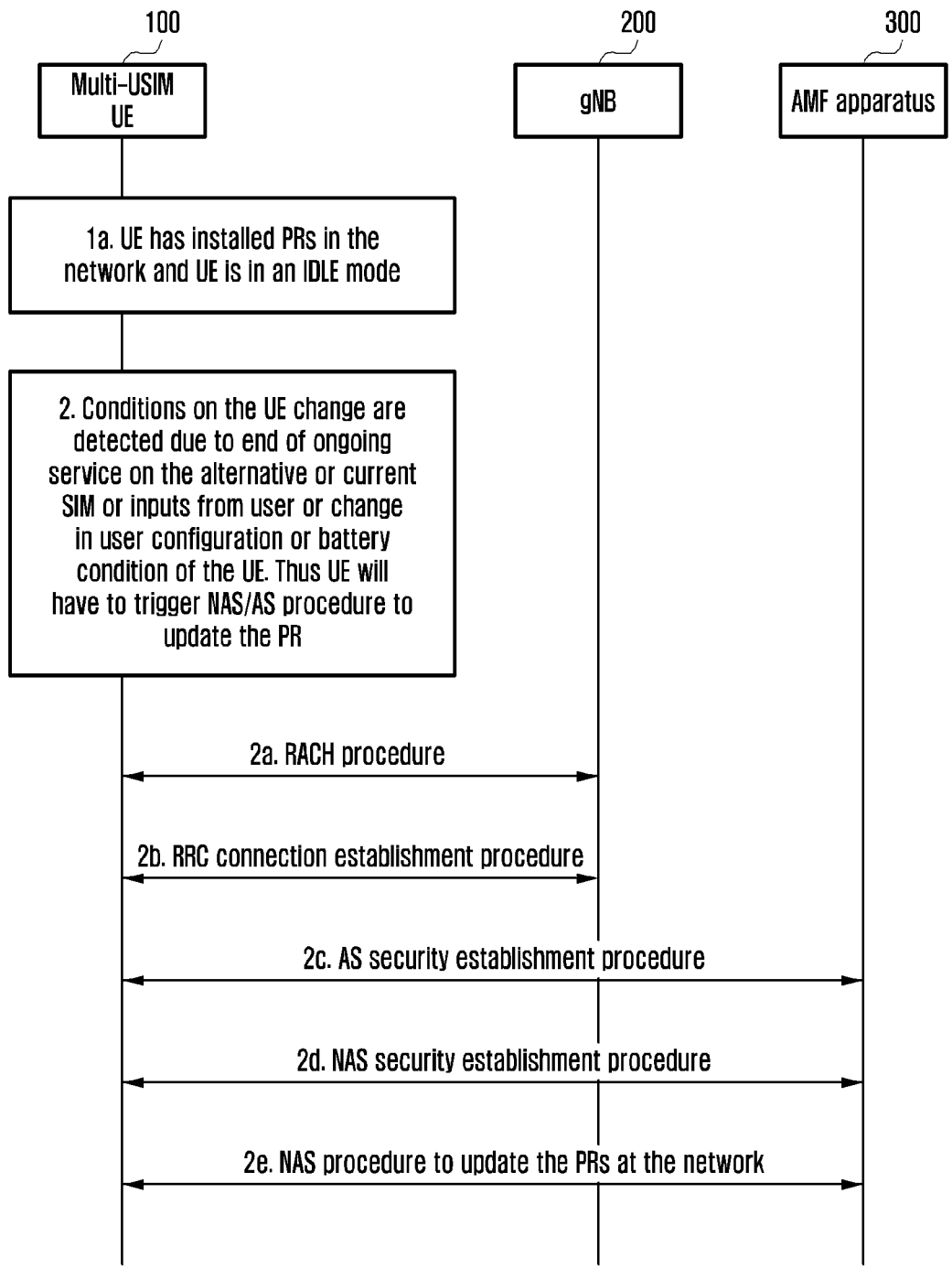
FIG. 1 illustrates an example sequence diagram depicting the process of updating the PRs according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein achieve a method for determining request for resources from a network apparatus in a wireless network. The method includes determining, by a first UE of the multi-USIM UE, that the first UE of the multi-USIM UE need to request for resources from the network apparatus in the wireless network to send pending uplink data to the network apparatus or receive pending downlink data from the network apparatus. Further, the method includes determining, by the first UE of the multi-USIM UE, whether the first UE of the multi-USIM UE may send a NAS message with a "release request indication" due to a service pending on a second UE of the multi-USIM UE.

Further, the method includes sending, by the first UE of the multi-USIM UE, the NAS message to the network apparatus without requesting for resources from the network apparatus in response to determining that the first UE of the multi-USIM UE may send a NAS message with the "release request indication."

The provided method can be used for performing PRs negotiation by waiting for the NAS trigger, where the UE of the multi-USIM UE may be capable of updating the PRs in the network and at the same time does not incur heavy cost to the network.

In an embodiment, the first UE and the second UE are part of same MUSIM UE. The first UE determines the first UE has either send uplink data or downlink data to be sent, this means the first UE is required to include uplink data status IE or allowed PDU session status or active flag or set the following on request bit set. The first UE also determines that the first UE may send a NAS message with a release request indication because service on the second UE may be initiated. The first UE triggers a NAS procedure (like registration procedure or service request procedure) with a leaving/release request indication, the first UE may not include uplink data status IE, allowed PDU session status IE, active status IE, or follow-on request bit. So, that the release procedure can be executed quickly without spending time on establishing the resources and the UE can be released to the IDLE state or Inactive state as quickly as possible.

In an embodiment, if there is a change in condition on the first UE due to which the first UE needs to update the PRs. The first UE is forbidden to send the NAS message to update the PRs. Further, the first UE waits for new trigger of NAS message due to some other reasons. When this NAS message due to new trigger is about to be sent, the PRs are piggybacked. The network apparatus processes the NAS message which was actually due to new trigger condition and also update the PRs. This avoids a NAS message which is sent dedicatedly to update the PRs from IDLE state and hence there is no signaling load on network apparatus due to updating of filters.

The multi-universal subscriber identity module (USIM) UE is a UE with multiple USIMs for capable of maintaining a separate registration state with a public land mobile network (PLMN) for each USIM at least over $3^{rd}$ generation partnership project (3GPP) access. In general, the UE and a network may support paging restrictions. The UE may indicate paging restrictions information in a non-access stratum (NAS) message like service request, extended service request or a tracking area procedures or registration procedure. The UE, if the network indicates that the network supports paging restrictions, may indicate paging restriction information which may indicate any of the following and not limited to:

a) all paging is restricted;
b) all paging is restricted, except paging for voice service (MMTel voice or circuit switch (CS) domain voice); or
c) all paging is restricted, except for certain packet data network (PDN) connection(s).

Once the UE has provided the paging restrictions (PRs) information to the network like an access and mobility management function (AMF) apparatus or mobility management entity (MME), the network may store this paging restrictions information (PRs) and restrict the paging procedure accordingly. Now, if the UE wants to update these PRs in the network due to changes in the conditions or services ongoing on a current USIM or the alternate USIM, then how may the UE update the network is not defined, as per the prior arts.

It may become obvious that whenever the conditions on the UE changes, the UE can initiate a NAS procedure like service request or registration request procedure to install the new PRs in the network. But, when the UE has already installed the PRs in the network, the UE is either in an IDLE mode or an INACTIVE state. So, executing the NAS procedure from this state may be a very costly operation. For example, if the UE is in the IDLE mode and if the UE may trigger the NAS procedure, the UE may execute the IDLE mode to connected mode procedures first which involves the random access channel (RACH) procedure followed by radio resource control (RRC) Establishment procedure followed by access stratum (AS) security procedure, which can be followed by non access stratum (NAS) security procedures at the minimum, which involves at least 8 message exchanges between the UE and the Network.

This simply means updating the paging restrictions is going to be very costly operation at the same time, the MUSIM UE wants to update the PRs for its correct operations. Thus, there is a need for a mechanism in which the UE may be capable of updating the PRs in the network and at the same time does not incur heavy cost to the network.

Figure 2:
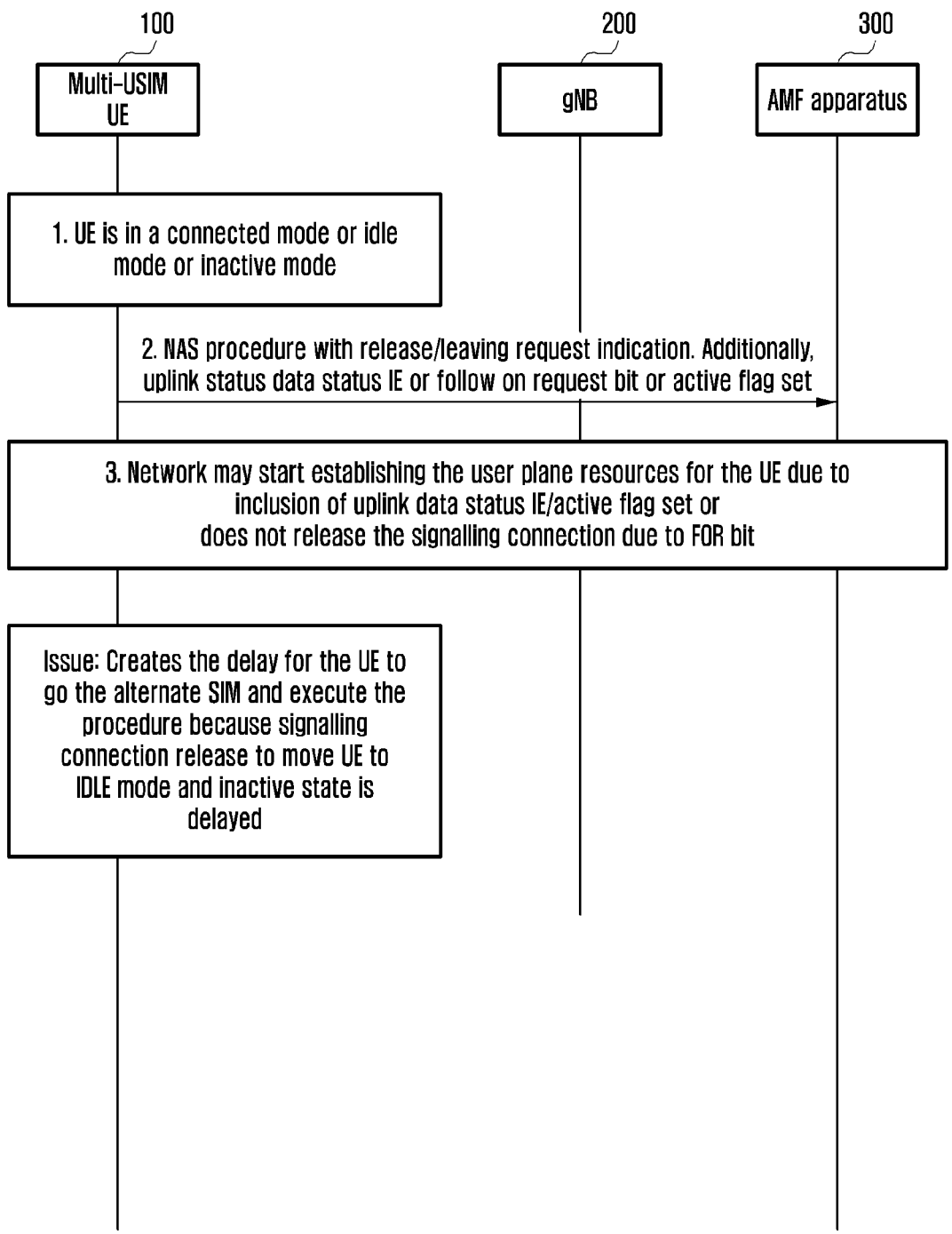
FIG. 2 illustrates another example sequence diagram depicting the process of updating the PRs according to various embodiments of the present disclosure.

FIGS. 1 and 2 are example sequence diagrams depicting the process of updating the PRs according to various embodiments of the present disclosure. It may assume that that the UE (100) had provided the paging restrictions information to the network, like the AMF apparatus (300) or the MME. In the previous leaving procedure, the network stores the paging restrictions information (PRs). Then, the network releases the UE (100) to the IDLE state or the INACTIVE state.

Now, if the UE (100) wants to update these PRs in the network, due to changes in the conditions or services ongoing on the current USIM or the alternate USIM or inputs from a user or a change in user configuration or battery conditions of the UE (100) or any other condition not listed here. It may become obvious that whenever the conditions on the UE (100) change, the UE (100) can initiate a non-access stratum (NAS)/access stratum (AS) procedure like service request or registration request procedure to install the new PRs in the network. But the key point to note is when the UE (100) has already installed the PRs in the network, the UE (100) is either in the IDLE state or INACTIVE state. So, executing a NAS procedure from this state may be a very costly operation.

As shown in the FIG. 1, step 1 the UE (100) has already installed the PRs in the network and UE (100) is in the IDLE mode. At step 2, the UE (100) may trigger the NAS procedure, the UE may execute the IDLE to Connected mode procedures first which involves execution of:

a) RACH procedure between the UE (100) and a gNB (200) (at step 2*a*);
b) Followed by RRC Establishment procedure between the UE (100) and a gNB (200)(at step 2*b*);
c) Followed by access stratum (AS) security procedure (at step 2*c*);
d) Followed by non access stratum (NAS) security procedures (at step 2*d*); and/or
e) At step 2*e*, the NAS procedure is to be update the PRs at the network.

To execute steps 2*a* to 2*d* at least 8-10 message exchanges may be required between the UE (100) and the Network. This simply means updating the paging restrictions is going to be very costly operation. Further, every change in the conditions on the USIM-1 triggering signaling load on the USIM-2 does not seem to be a reasonable approach. For example, if a call has ended on a first operator (related to USIM-1), the UE (100) triggered signaling on a second operator (related to USIM-2). Or due to a SMS reception from the first operator triggering signaling on the second operator etc. to update PRs could turn out to be costly to the second operator. In other words, the condition change in the UE (100) to update the PRs in the network can be very frequent, if this result in excessive signaling load on the operator is not desirable.

As shown in the FIG. 2, at step 1, the UE (100) is in the connected mode or the idle mode or the inactive mode. At step 2, the UE (100) sends the NAS procedure with a release/leaving request indication to the AMF apparatus (300). Additionally, the NAS message also includes an uplink status data status IE or follow-on request bit or active flag set, this is to request the resource from network like user plane resources or the NAS signalling connection by the UE. At step 3, the network may start establishing the user plane resources for the UE (100) due to inclusion of uplink data status IE/active flag set or does not release the signalling connection due to bit. This generates the delay for the UE (100) to go an alternate SIM and execute the procedure because signalling connection release to move the UE (100) to IDLE mode and inactive state is delayed.

Thus, there is a need for a mechanism in which the UE (100) may be capable of updating the PRs in the network, do not generate any delays in releasing the signaling connection and at the same time does not incur heavy cost to the network too.

Referring now to the drawings, and more particularly to FIG. 3 to 7, where similar reference characters denote corresponding features consistently throughout the figures, there are shown at least one embodiment.

Figure 3:
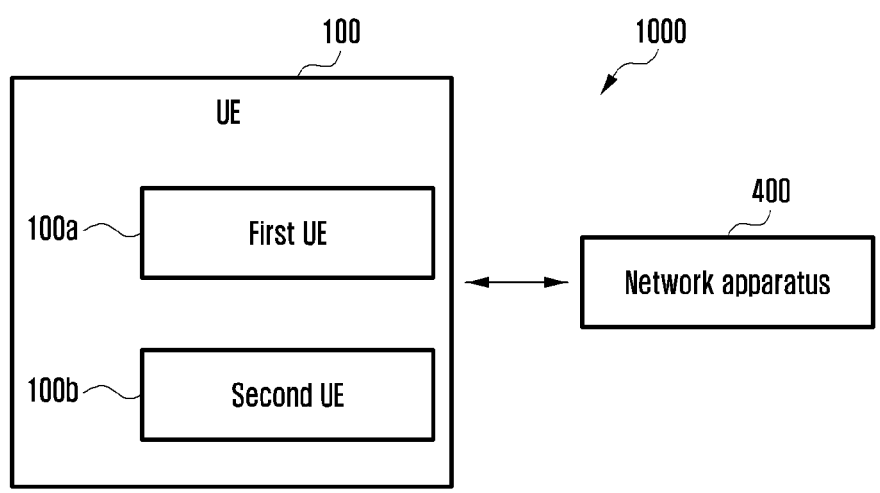
FIG. 3 illustrates an overview of a wireless network for determining a request for resources from a network apparatus according to various embodiments of the present disclosure.

FIG. 3 illustrates an overview of a wireless network (1000) for the determining a request for resources from a network apparatus (400) according to various embodiments of the present disclosure. In an embodiment, the wireless network (1000) includes a multi-USIM UE (100) and a network apparatus (400). The multi-USIM UE (100) can be, for example, but not limited to a laptop, a desktop computer, a notebook, a relay device, a device-to-device (D2D) device, a vehicle to everything (V2X) device, a smartphone, a tablet, an immersive device, and an internet of things (IoT) device. The multi-USIM UE (100) includes the first UE (100a) and the second UE (100b).

The first UE (100a) is configured to determine that the first UE (100a) of the multi-USIM UE need to request for resources from the network apparatus (400) in the wireless network (1000) to send pending uplink data to the network apparatus (400) or receive pending downlink data from the network apparatus (400). The resources are one of the user-plane resources or the NAS signaling connection. Further, the first UE (100a) of the multi-USIM UE (100) is configured to determine whether the first UE (100a) may send a NAS message with a "release request indication" due to the service pending on the second UE (100b) of the multi-USIM UE (100).

Further, the first UE (100a) is configured to generate the NAS message by "not including the uplink data status IE (Information Element), the allowed PDU session status IE, the active status IE" or "by setting a follow-on request indicator to "no follow-on request pending." Further, the first UE (100a) is configured to send the generated NAS message to the network apparatus (400).

Further, the first UE (100a) is configured to determine whether the first UE (100) is in an idle state. Further, the first UE (100a) is configured to forbid the first UE (100) to request the resources from the network apparatus (400) by sending the NAS message with the "release request indication" to update the paging restrictions information. The first UE (100) to request the resources from the network apparatus (400) is forbid by determining whether another NAS message is triggered due to another reason, wherein the triggered second NAS message is piggy backed with updated paging restriction information and the release request indication.

In an embodiment, the multi-USIM UE (100) had provided the paging restrictions information to the network like AMF apparatus (300) or MME in the previous leaving procedure, the network apparatus (400) stores these paging restrictions information (PRs) or alternatively, the network apparatus (400) is not storing the paging restriction information. Then, the network apparatus (400) releases the multi-USIM (100) to the IDLE state or INACTIVE state. If the multi-USIM UE (100) wants to update or install these PRs in the network apparatus (400) due to changes in the conditions or services ongoing on the current USIM or the alternate USIM or inputs from user or change in user configuration or battery conditions of the multi-USIM UE (100) or any other condition not listed here. The multi-USIM UE (100) does not trigger a NAS/AS procedure immediately. The multi-USIM UE (100) waits for the next trigger of the NAS procedure (example registration procedure or service request procedure) or the AS procedure, due to other reasons in the 3GPP specification like TS 24.501, TS 23.501, or TS 23.502.

For example, the triggers can be any of the below as described in TS 24.501 and not limited to:
- a) When the multi-USIM UE (100) detects entering a tracking area that is not in the list of tracking areas that the UE previously registered in the AMF apparatus (300);
- b) When the periodic registration updating timer T3512 expires in 5GMM-IDLE mode;
- c) When the multi-USIM UE (100) receives a CONFIGURATION UPDATE COMMAND message indicating "registration requested" in the registration requested bit of the configuration update indication IE as specified in 3GPP standard specification;
- d) When the multi-USIM UE (100) in a state 5GMM-REGISTERED.ATTEMPTING-REGISTRATION-UPDATE either receives a paging or the multi-USIM UE (100) receives a notification message with access type indicating 3GPP access over the non-3GPP access for PDU sessions associated with 3GPP access;
- e) Upon inter-system change from S1 mode to N1 mode and if the multi-USIM UE (100) previously had initiated an attach procedure or a tracking area updating procedure when in S1 mode;
- f) When the multi-USIM UE (100) receives an indication of "RRC connection failure" from the lower layers and does not have signalling pending (i.e., when the lower layer requests NAS signalling connection recovery) except for the case specified in 3GPP standard specification;
- g) When the multi-USIM UE (100) changes the 5GMM capability or the S1 UE network capability or both;
- h) When the UE's usage setting changes;
- i) When the multi-USIM UE (100) needs to change the slice(s) it is currently registered to;
- j) When the multi-USIM UE (100) changes the UE specific discontinuous reception (DRX) parameters;
- k) When the multi-USIM UE (100) in state 5GMM-REGISTERED.ATTEMPTING-REGISTRATION- UPDATE receives a request from the upper layers to establish an emergency PDU session or perform emergency services fallback;

l) When the multi-USIM UE (100) needs to register for a short message service (SMS) over NAS, indicate a change in the requirements to use the SMS over NAS, or de-register from the SMS over NAS;

m) When the multi-USIM UE (100) needs to indicate PDU session status to the network after performing a local release of PDU session(s) as specified in 3GPP standard specification;

n) When the multi-USIM UE (100) in the 5GMM-IDLE mode changes the radio capability for NG-RAN or E-UTRAN;

o) When the multi-USIM UE (100) receives a fallback indication from the lower layers and does not have signalling pending (i.e., when the lower layer requests NAS signalling connection recovery as specified in 3GPP standard specification);

p) Void;

q) When the multi-USIM UE (100) needs to request new LADN information;

r) When the multi-USIM UE (100) needs to request the use of mobile initiated connection only (MICO) mode or needs to stop the use of the MICO mode or to request the use of new T3324 value;

s) When the multi-USIM UE (300) in the 5GMM-CONNECTED mode with the RRC inactive indication enters a cell in the current registration area belonging to an equivalent PLMN of the registered PLMN and not belonging to the registered PLMN;

t) When the multi-USIM UE (100) receives over 3GPP access a service reject message or a downlink (DL) NAS TRANSPORT message, with the 5GMM cause value set to #28 "Restricted service area";

u) When the multi-USIM UE (100) needs to request the use of eDRX, when a change in the eDRX usage conditions at the UE (100) requires different extended DRX parameters, or needs to stop the use of eDRX. Also, a change in the eDRX usage conditions at the UE (100) can include, e.g., a change in the UE configuration, a change in requirements from upper layers or the battery running low at the UE (100);

v) When the multi-USIM UE (100) supporting a fifth-generation single-radio voice call continuity (5G-SRVCC) from a next generation radio access network (NG-RAN) to universal terrestrial radio access network (UTRAN) changes the mobile station class mark 2 or the supported codecs;

w) When the multi-USIM UE (100) in state 5GMM-REGISTERED.ATTEMPTING-REGISTRATION-UPDATE decides to request new network slices after being rejected due to no allowed network slices requested;

x) When the multi-USIM UE (100) is not in NB-N1 mode and the applicable UE radio capability ID for the current UE radio configuration changes due to a revocation of the network-assigned UE radio capability IDs by the serving PLMN or SNPN;

y) When the multi-USIM UE (100) receives a REGISTRATION REJECT message with 5GMM cause values #3, #6 or #7 without integrity protection over another access;

z) When the multi-USIM UE (100) needs to request new ciphering keys for ciphered broadcast assistance data;

aa) When due to manual CAG selection, the multi-USIM UE (100) has selected a CAG-ID which is not included in the "allowed CAG list" for the selected PLMN or a CAG-ID in a PLMN for which the entry in the "CAG information list" does not exist or when the UE has selected, without selecting a CAG-ID, a PLMN for which the entry in the "CAG information list" includes an "indication that the multi-USIM UE (100) is only allowed to access 5GS via CAG cells";

bb) When the multi-USIM UE (100) needs to start, stop or change the conditions for using the WUS assistance information;

cc) When the multi-USIM UE (100) changes the UE specific DRX parameters in NB-N1 mode; and/or dd) When the multi-USIM UE (100) in the 5GMM-CONNECTED mode with an RRC inactive indication enters a new cell with different RAT in current TAI list or not in a current TAI list.

When the NAS procedure (like registration or service request procedure) is triggered in the multi-USIM UE (100) due to the reasons specified in TS 24.501, then as part of this NAS procedure, the multi-USIM UE (100) also provides the latest PRs to the network. The NAS procedure in this step is indicative that it can be either the NAS or the AS procedure, which may lead the multi-USIM UE (100) to interact with the network; for example, by getting into the connected mode.

In an embodiment herein, the multi-USIM UE (100) can be configured (either it can be provided in NAS signalling message from a VPLMN or a HPLMN or using data path or any other medium of transport or it can be pre-configured in the USIM) with a timer value by the network, the timer is started each time PRs are installed/updated in the network, when the timer expires, the multi-USIM UE (100) is again allowed to trigger a NAS or AS procedure to install/update the PRs in the network. With this, the network may be able to control the frequency of updating the PRs and with this, the network can control the load at the network; i.e., while the timer is running, the UE is not allowed to update the PRs.

The network apparatus (400) receives the updated PRs as part of the new NAS or the AS procedure, the network apparatus (400) stores the updated PRs and applies the paging restrictions, as per the updated PRs.

In an embodiment herein, if the multi-USIM UE (100) wants to update or install the PRs, the multi-USIM UE (100) can initiate the first NAS procedure like the service request with FOR (follow on request) bit set, so that the network does not release the NAS signalling connection after the execution of the first NAS procedure. After the first NAS procedure, the multi-USIM UE (100) initiates the service request or registration request procedure with a leaving/release request indication along with information of the PRs. The network apparatus (400) receives the updated PRs as part of the new NAS or AS procedure, the network stores the updated PRs and apply the paging restrictions, as per the updated PRs.

When the multi-USIM UE (100) triggers the NAS procedure (like registration procedure or service request procedure) with a leaving/release request indication, the multi-USIM UE (100) may not include uplink data status IE, allowed PDU session status IE, active status IE or follow-on request (FOR) bit. So, that the procedure can be executed quickly and the multi-USIM UE (100) can be released to the IDLE state or inactive state as quickly as possible.

If the multi-USIM UE (100) includes a leaving/release request indication and also one or more of the: uplink data status IE, allowed PDU session status IE, active status IE or follow-on request bit the AMF apparatus (300) or MME may neglect the uplink data Status IE, allowed PDU session status IE, active status IE, or follow-on request bit received from the multi-USIM UE (100). The multi-USIM UE (100) may progress with a leaving/release request indication and release the multi-USIM UE (100) to the IDLE state or inactive state.

If the multi-USIM UE (100) includes a leaving/release request indication and also one or more of the: uplink data status IE, the allowed PDU session status IE, the active status IE or the follow-on request bit the network (e.g., AMF apparatus (300) or MME) may neglect the leaving/release request indication received from the multi-USIM UE (100). The multi-USIM UE (100) may progress with uplink data status IE, the allowed PDU session status IE, the active status IE or the follow-on request bit status handling to establish the user plane resources or do not release the NAS signalling connection.

The terms (also called as indication) release request indication, release flag, leaving indication, request type set to "NAS signalling connection release" in the UE request type IE all have the same meaning. Inclusion of this indication in the NAS message corresponds to requesting the network to release the UE (100) to IDLE or RRC Inactive state.

Figure 4A:
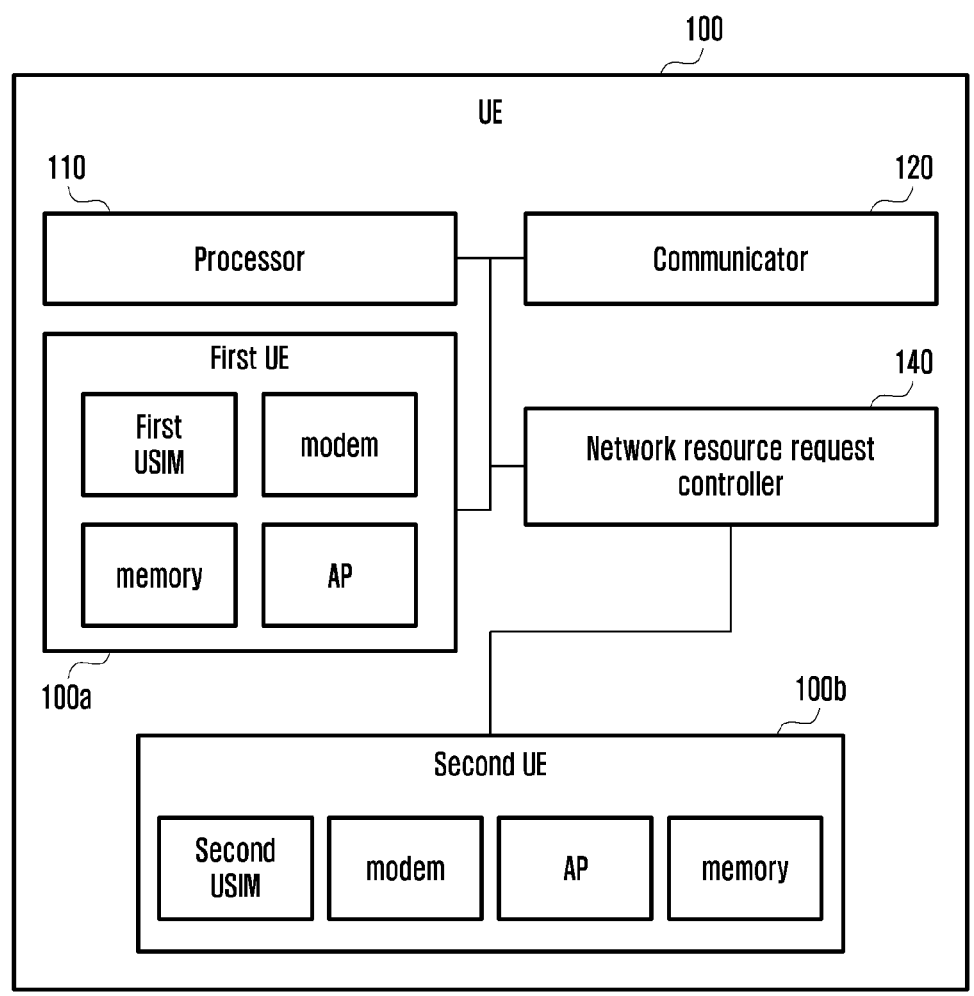
FIG. 4a illustrates various hardware components of a UE according to various embodiments of the present disclosure.

FIG. 4a illustrates various hardware components of the multi-USIM UE (100) according to various embodiments of the present disclosure. In an embodiment, the multi-USIM UE (100) includes the first UE (100a), the second UE (100b), a processor (110), a communicator (120), and a network resource request controller (140). The first UE (100a) includes a USIM-1, a modem, memory, and an application processor (AP). The second UE includes a USIM-2, a modem, memory, and an AP. The network resource request controller (140) is communicatively coupled to the processor (110), the first UE (100a) and the second UE (100b).

The network resource request controller (140) is configured to determine that the first UE (100a) of the multi-USIM UE (100) need to request for resources from the network apparatus (400) in the wireless network (1000) to send pending uplink data to the network apparatus (400) or receive pending downlink data from the network apparatus (400). Further, the network resource request controller (140) is configured to determine whether the first UE (100a) of the multi-USIM UE (100) may send the NAS message with a "release request indication" due to the service pending on the second UE (100b) of the multi-USIM UE (100).

Further, the network resource request controller (140) is configured to generate the NAS message by "not including the uplink data status IE (Information Element), the allowed PDU session status IE, the active status IE" or "by setting a follow-on request indicator to "no follow-on request pending." Further, the network resource request controller (140) is configured to send the generated NAS message to the network apparatus (400).

Further, the network resource request controller (140) is configured to determine whether the first UE (100) of the multi-USIM UE (100) is in the idle state. Further, the network resource request controller (140) is configured to forbid the first UE (100) of the multi-USIM UE (100) to request the resources from the network apparatus (400) by sending the NAS message with the "release request indication" to update the paging restrictions information. The first UE (100) of the multi-USIM UE (100) to request the resources from the network apparatus (400) is forbid by determining whether another NAS message is triggered due to another reason, wherein the triggered second NAS message is piggy backed with updated paging restriction information and the release request indication.

The network resource request controller (140) is physically implemented by analog and/or digital circuits such as logic gates, integrated circuits, microprocessors, microcontrollers, memory circuits, passive electronic components, active electronic components, optical components, hard-wired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 4a shows various hardware components of the UE (100) but it is to be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 4B:
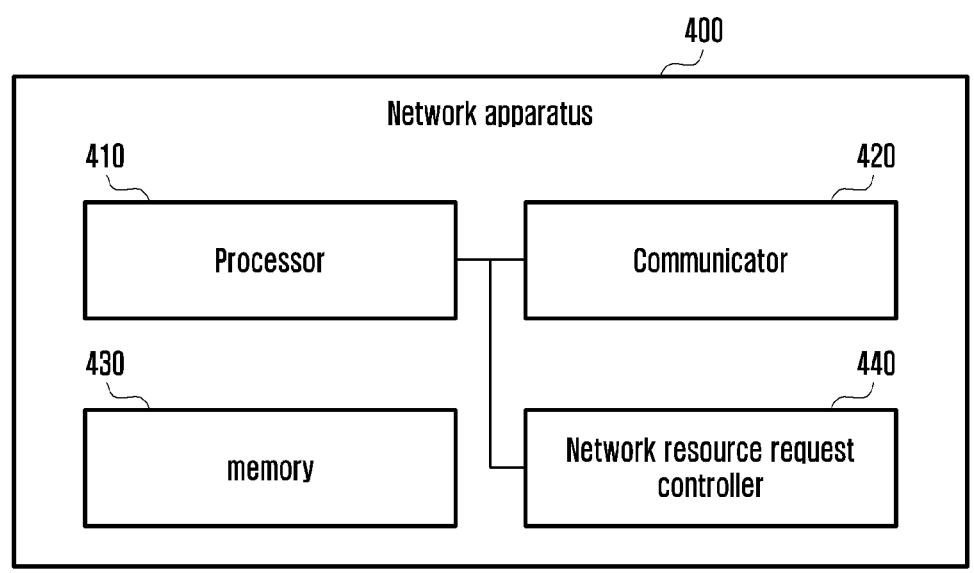
FIG. 4b illustrates various hardware components of the network apparatus according to various embodiments of the present disclosure.

FIG. 4b illustrates various hardware components of the network apparatus (400) according to various embodiments of the present disclosure. In an embodiment, the network apparatus (400) includes a processor (410), a communicator (420), memory (430), and a network resource request controller (440). The processor (410) is coupled with the communicator (420), the memory (430) and the network resource request controller (440).

The network resource request controller (440) is configured to receive the NAS message. Based on the received NAS message, the network resource request controller (440) is configured to delete old PRs, store updated PRs, and start to apply PRs accordingly.

The network resource request controller (440) is physically implemented by analog and/or digital circuits such as logic gates, integrated circuits, microprocessors, microcontrollers, memory circuits, passive electronic components, active electronic components, optical components, hard-wired circuits and the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in random access memory (RAM) or cache).

Although the FIG. 4b shows various hardware components of the network apparatus (400) but it is to be understood that other embodiments are not limited thereon. In other embodiments, the network apparatus (400) may include less or more number of components. Further, the labels or names of the components are used only for illustrative purpose and does not limit the scope of the present disclosure. One or more components can be combined together to perform same or substantially similar function in the network apparatus (400).

Figure 5:
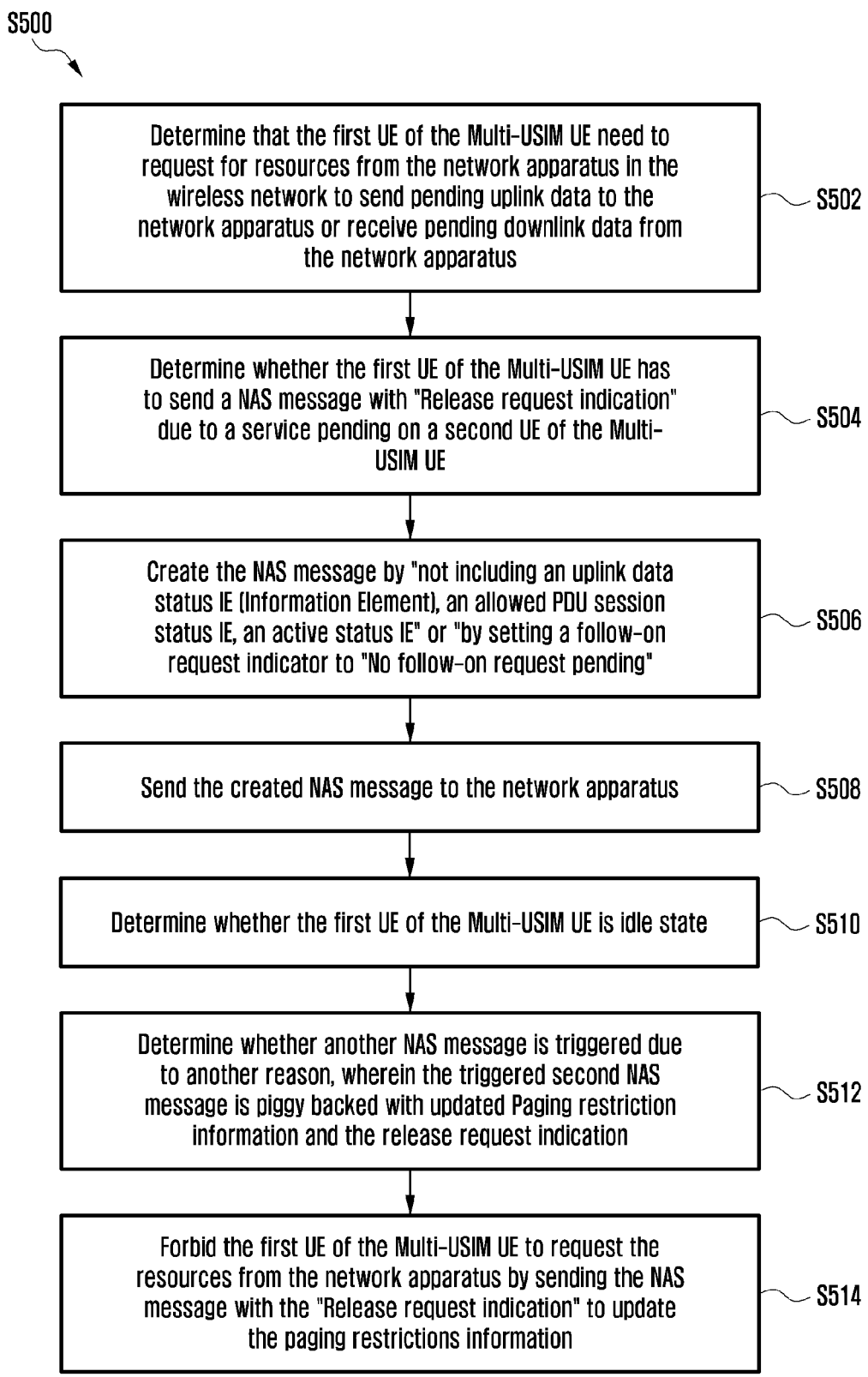
FIG. 5 is a flow chart illustrating a method, implemented by the UE, for determining the request for the resources from the network apparatus in the wireless network according to various embodiments of the present disclosure.

FIG. 5 is a flow chart (S500) illustrating a method, implemented by the multi-USIM UE (100), for determining request for resources from the network apparatus (400) in the wireless network (1000), according to various embodiments of the present disclosure. The operations (S502-S514) are performed by the network resource request controller (140).

At S502, the method includes determining that the first UE (100a) of the multi-USIM UE (100) need to request for resources from the network apparatus (400) in the wireless network (1000) to send pending uplink data to the network apparatus (400) or receive pending downlink data from the network apparatus (400). At S504, the method includes determining whether the first UE (100a) of the multi-USIM UE (100) may send the NAS message with a "release request indication" due to a service pending on the second UE (100b) of the multi-USIM UE (100). At S506, the method includes creating the NAS message by "not including an uplink data status IE, an allowed PDU session status IE, an active status IE" or "by setting a follow-on request indicator to "no follow-on request pending." At S508, the method includes sending the generated NAS message to the network apparatus (400). At S510, the method includes determining whether the first UE (100a) of the multi-USIM UE (100) is in the idle state. At S512, the method includes determining whether another NAS message is triggered due to another reason. The triggered second NAS message is piggy backed with updated paging restriction information and the release request indication. At S514, the method includes forbidding the first UE (100a) of the multi-USIM UE (100) to request the resources from the network apparatus (400) by sending the NAS message with the "release request indication" to update the paging restrictions information.

Figure 6:
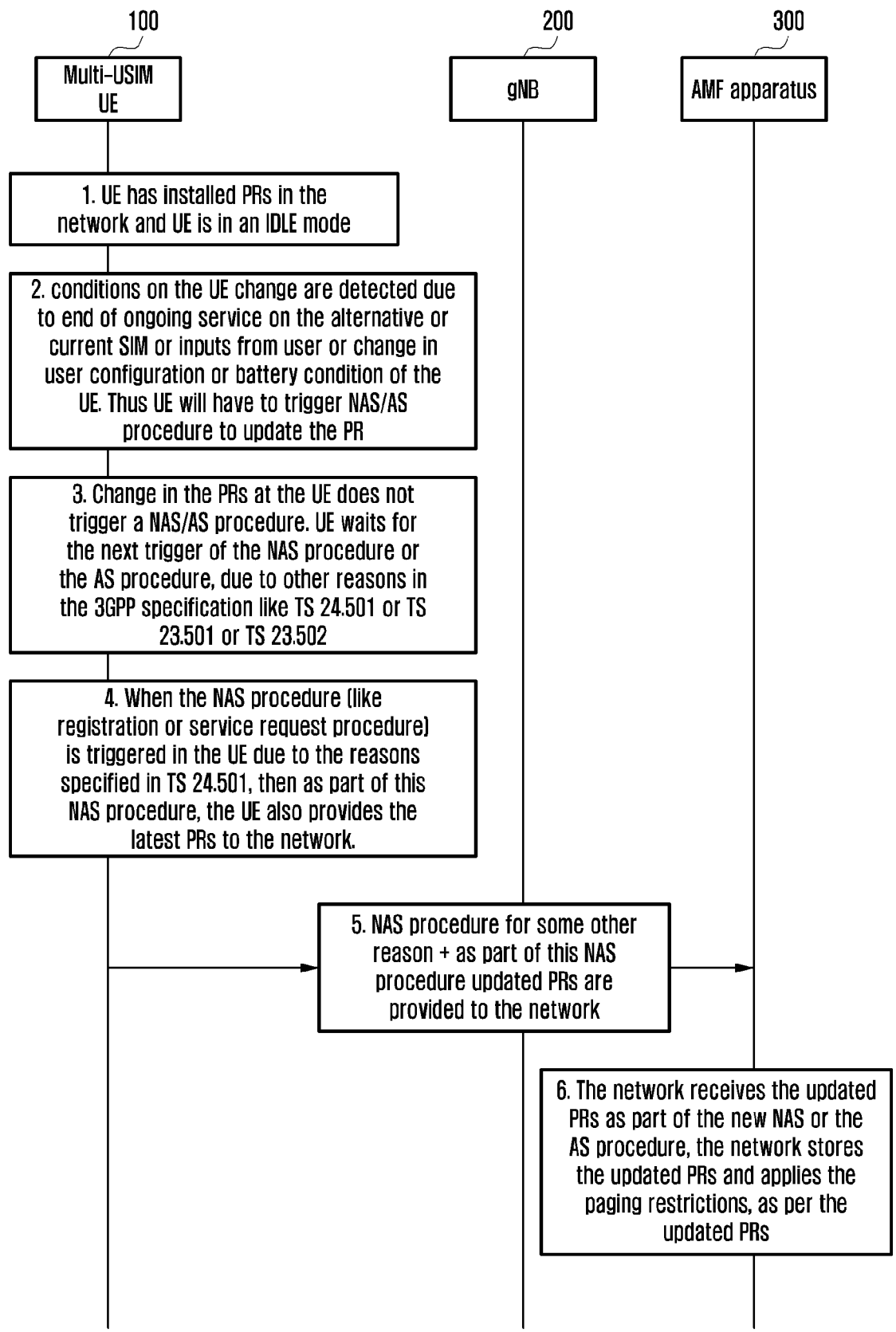
FIG. 6 is a sequence diagram illustrating a method for determining request for resources from the network apparatus according to various embodiments of the present disclosure.

FIG. 6 is a sequence diagram illustrating a method for determining the request for the resources from the network apparatus (400) in the wireless network (1000) according to various embodiments of the present disclosure.

At step 1, the multi-USIM UE (100) has installed the PRs in the network (1000) and the multi-USIM UE (100) is in the IDLE mode. At step 2, the conditions on the multi-USIM UE changes are occurred due to end of ongoing service or current SIM or inputs from the user or change in user configuration or battery condition of the multi-USIM UE (100). Thus, the multi-USIM UE (100) may trigger a NAS/AS procedure to update the PR. At step 3, the change in the PRs at the Multi-USIM UE (100) does not trigger the NAS/AS procedure. The multi-USIM UE (100) waits for the next trigger of the NAS procedure or the AS procedure, due to other reasons in the 3GPP specification like TS 24.501 or TS 23.501 or TS 23.502.

At step 4, when the NAS procedure (e.g., registration procedure or service request procedure) is triggered in the multi-USIM UE (100) due to the reasons specified in TS 24.501, then as part of this NAS procedure, the multi-USIM UE (100) also provides the latest PRs to the network (1000). At step 5, the NAS procedure and as part of the NAS procedure updated PRs are provided to the network (1000). At step 6, the network (1000) receives the updated PRs as part of the new NAS or the AS procedure, the network (1000) stores the updated PRs and applies the paging restrictions, as per the updated PRs.

The provided method is equally applicable to both the 5GS and 4GS radio access technologies. Respective RAN nodes to be used is eNB for EPS/4GS NG-eNB/gNB for NR/5GS.

Figure 7:
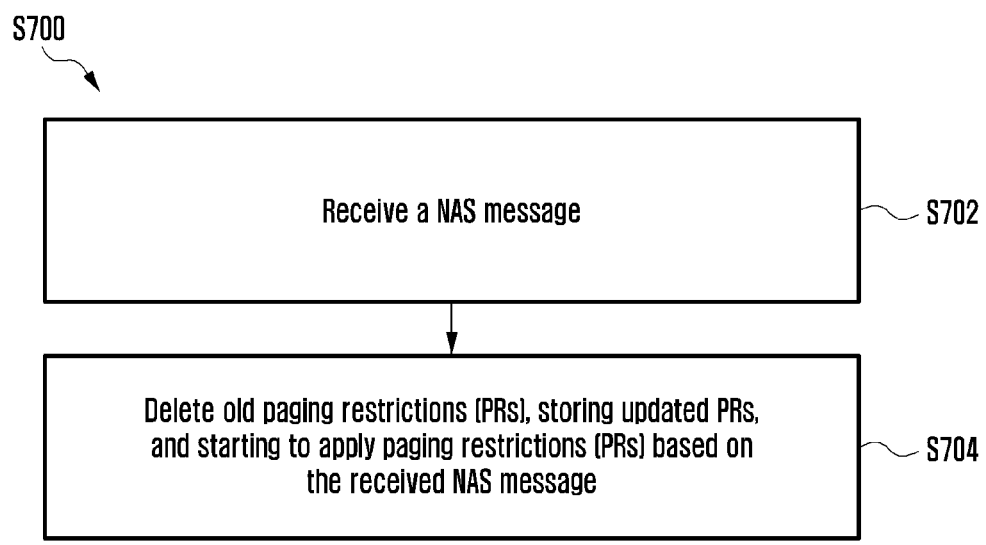
FIG. 7 is a flow chart illustrating a method for determining request for resources from the network apparatus in the wireless network according to various embodiments of the present disclosure.

FIG. 7 is a flow chart (S700) illustrating a method for determining request for resources from the network apparatus (400) in the wireless network (1000) according to various embodiments of the present disclosure. The operations (S702 and S704) are performed by the network resource request controller (440).

At S702, the method includes receiving the NAS message. At S704, the method includes deleting old PRs, storing updated PRs, and starting to apply PRs based on the received NAS message.

The various actions, acts, blocks, steps, or the like in the flow charts (S500 and S700) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) supporting a multi-universal subscriber identity module (MUSIM) in a wireless network, the method comprising:
    determining whether to release a connection associated with a first USIM of MUSIM for a second USIM of MUSIM;

determining to set a release request indication in a non-access stratum (NAS) message in case that the connection associated with the first USIM of the MUSIM is determined to release; and transmitting, to a network apparatus, the NAS message with the release request indication, wherein uplink data status information and allowed protocol data unit (PDU) session status information are not included in the NAS message, in case that the release request indication is set in the NAS message.

2. The method of claim 1, wherein a follow-on request indicator is not included in the NAS message, in case that the release request indication is set in the NAS message.

3. The method of claim 1, wherein active status information is not included in the NAS message, in case that the release request indication is set in the NAS message.

4. The method of claim 1, further comprising:

determining an update of new paging restriction information is needed during the UE is being in an idle state or an inactive state, wherein the UE waits to update the new paging restriction information until a new NAS procedure is triggered.

5. The method of claim 4, further comprising:

determining whether the new NAS procedure is triggered due to a first reason different from a second reason for updating paging restriction information; and transmitting a new NAS message including the new paging restriction information based on the new NAS procedure.

6. The method of claim 1, further comprising:

in case that the UE wants to update paging restriction information, initiating a first NAS procedure with a follow-on request indicator being set follow-on request pending; and not releasing a NAS signaling connection after a completion of the first NAS procedure; and transmitting a new NAS message including the paging restriction information and the release request indication after the completion of the first NAS procedure.

7. A user equipment (UE) supporting multi-universal subscriber identity module (MUSIM) in a wireless network, the UE comprising:

a transceiver; and a processor configured to:

determine whether to release a connection associated with a first USIM of MUSIM for a second USIM of MUSIM, determine to set a release request indication in a non-access stratum (NAS) message in case that the connection associated with the first USIM of the MUSIM is determined to release, and transmit, to a network apparatus via the transceiver, the NAS message with the release request indication, wherein uplink data status information and allowed protocol data unit (PDU) session status information are not included in the NAS message, in case that the release request indication is set in the NAS message.

8. The UE of claim 7, wherein a follow-on request indicator is not included in the NAS message, in case that the release request indication is set in the NAS message.

9. The UE of claim 7, wherein active status information is not included in the NAS message, in case that the release request indication is set in the NAS message.

10. The UE of claim 7, wherein the processor is further configured to:

determine an update of new paging restriction information is needed during the UE is being in an idle state or an inactive state, wherein the UE waits to update the new paging restriction information until a new NAS procedure is triggered.

11. The UE of claim 10, wherein the processor is further configured to:

determine whether the new NAS procedure is triggered due to a first reason different from a second reason for updating paging restriction information, and transmit a new NAS message including the new paging restriction information based on the new NAS procedure.

12. The UE of claim 7, wherein the processor is configured to:

in case that the UE wants to update paging restriction information, initiate a first NAS procedure with a follow-on request indicator being set follow-on request pending, and not release a NAS signaling connection after a completion of the first NAS procedure, and transmit a new NAS message including the paging restriction information and the release request indication after the completion of the first NAS procedure.

13. A method of a network apparatus in a wireless network, the method comprising:

receiving, from a user equipment (UE) supporting a multi-universal subscriber identity module (MUSIM), a non-access stratum (NAS) message including release request indication and new paging restriction information;

deleting an old paging restriction;

storing the new paging restriction information; and applying the new paging restriction information based on the NAS message, wherein uplink data status information and allowed protocol data unit (PDU) session status information are not included in the NAS message, in case that the release request indication is set in the NAS message.

14. The method of claim 13, wherein a follow-on request indicator is not included in the NAS message, in case that the release request indication is set in the NAS message, and wherein active status information is not included in the NAS message, in case that the release request indication is set in the NAS message.

15. The method of claim 13, wherein the UE waits to update the new paging restriction information until a new NAS procedure is triggered, and wherein, in case that the new NAS procedure is triggered due to a first reason different from a second reason for updating the new paging restriction information, the NAS message including the new paging restriction information is received from the UE.

16. The method of claim 13, wherein, in case that the UE wants to update paging restriction information, a first NAS procedure is initiated with a follow-on request indicator being set follow-on request pending, wherein a NAS signaling connection is not released after a completion of the first NAS procedure, and wherein a new NAS message including the paging restriction information and the release request indication is received from the UE after the completion of the first NAS procedure.

17. A network apparatus in a wireless network, the network apparatus comprising:
- a transceiver; and
- a processor configured to
  - receive, via the transceiver from a user equipment (UE) supporting a multi-universal subscriber identity module (MUSIM), a non-access stratum (NAS) message including release request indication and new paging restriction information,
  - delete old paging restriction,
  - store the new paging restriction information, and
  - apply the new paging restriction information based on the NAS message,
- wherein uplink data status information and allowed protocol data unit (PDU) session status information are not included in the NAS message, in case that the release request indication is set in the NAS message.

18. The network apparatus of claim 17,
- wherein a follow-on request indicator is not included in the NAS message, in case that the release request indication is set in the NAS message, and
- wherein active status information is not included in the NAS message, in case that the release request indication is set in the NAS message.

19. The network apparatus of claim 17,
- wherein the UE waits to update the new paging restriction information until a new NAS procedure is triggered, and
- wherein, in case that the new NAS procedure is triggered due to a first reason different from a second reason for updating the new paging restriction information, the NAS message including the new paging restriction information is received from the UE.

20. The network apparatus of claim 18,
- wherein, in case that the UE wants to update paging restriction information, a first NAS procedure is initiated with a follow-on request indicator being set follow-on request pending,
- wherein a NAS signaling connection is not released after a completion of the first NAS procedure, and
- wherein a new NAS message including the paging restriction information and the release request indication is received from the UE after the completion of the first NAS procedure.

* * * * *